Oct. 11, 1949.  J. R. DUNBAR  2,484,210
CONTROL AND TESTING SYSTEM
Filed May 2, 1947  3 Sheets-Sheet 1
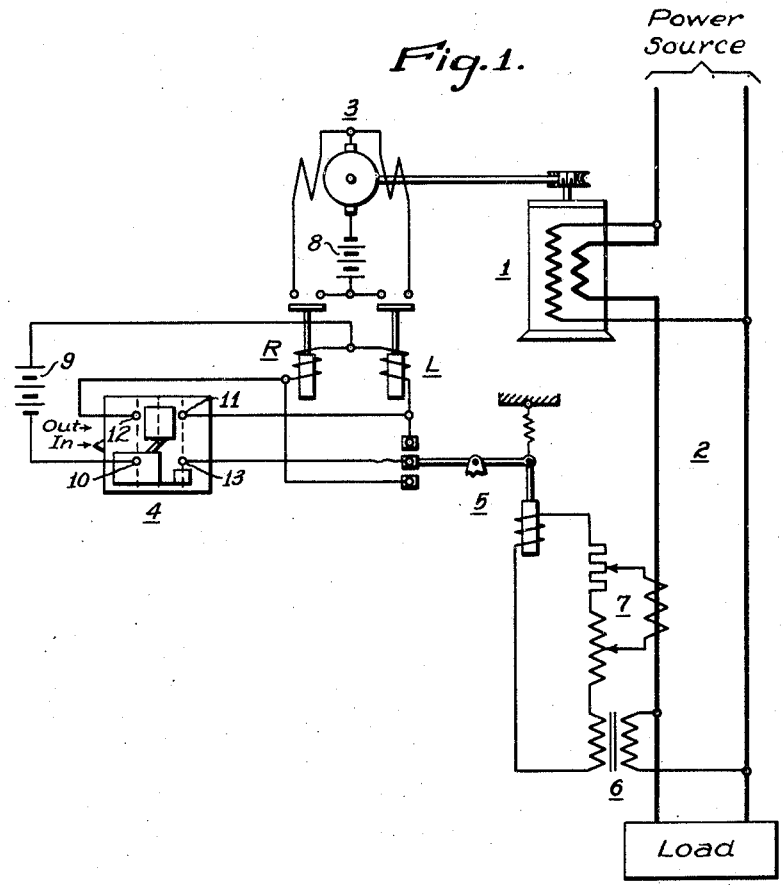
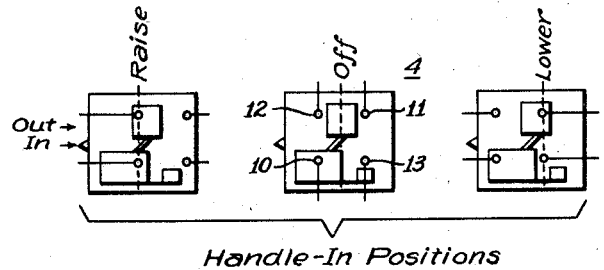
Handle-In Positions
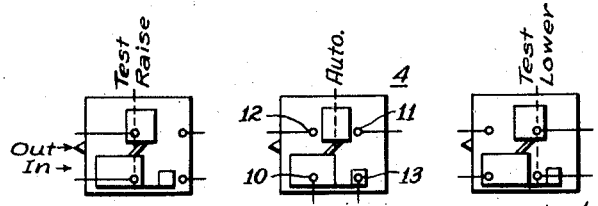
Handle-Out Positions
INVENTOR
John R. Dunbar.

Oct. 11, 1949.  J. R. DUNBAR  2,484,210
CONTROL AND TESTING SYSTEM
Filed May 2, 1947  3 Sheets-Sheet 2
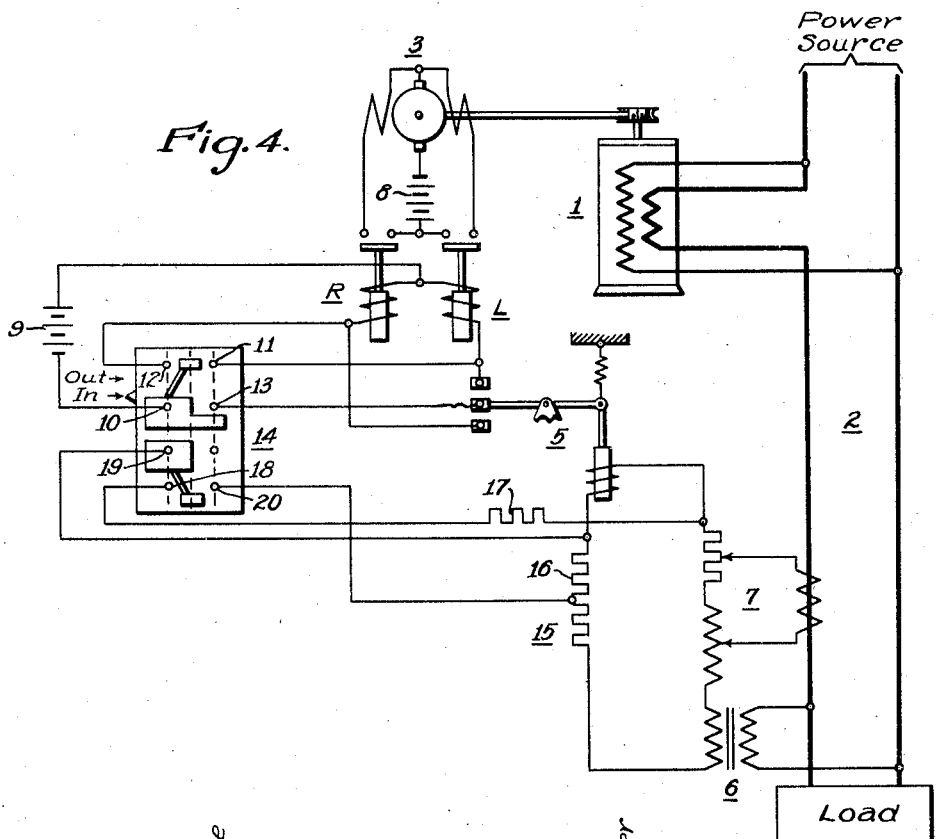
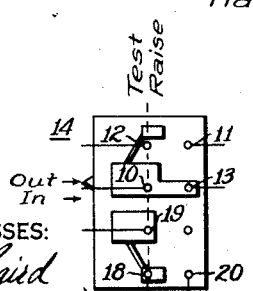
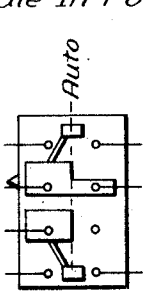
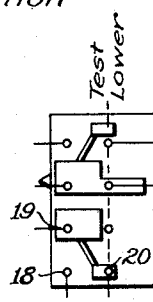
Handle In Position
Handle Out Position
WITNESSES:
Robert C. Baird
INVENTOR
John R. Dunbar.
BY
G. M. Crawford
ATTORNEY Oct. 11, 1949.  J. R. DUNBAR  2,484,210
CONTROL AND TESTING SYSTEM
Filed May 2, 1947  3 Sheets-Sheet 3
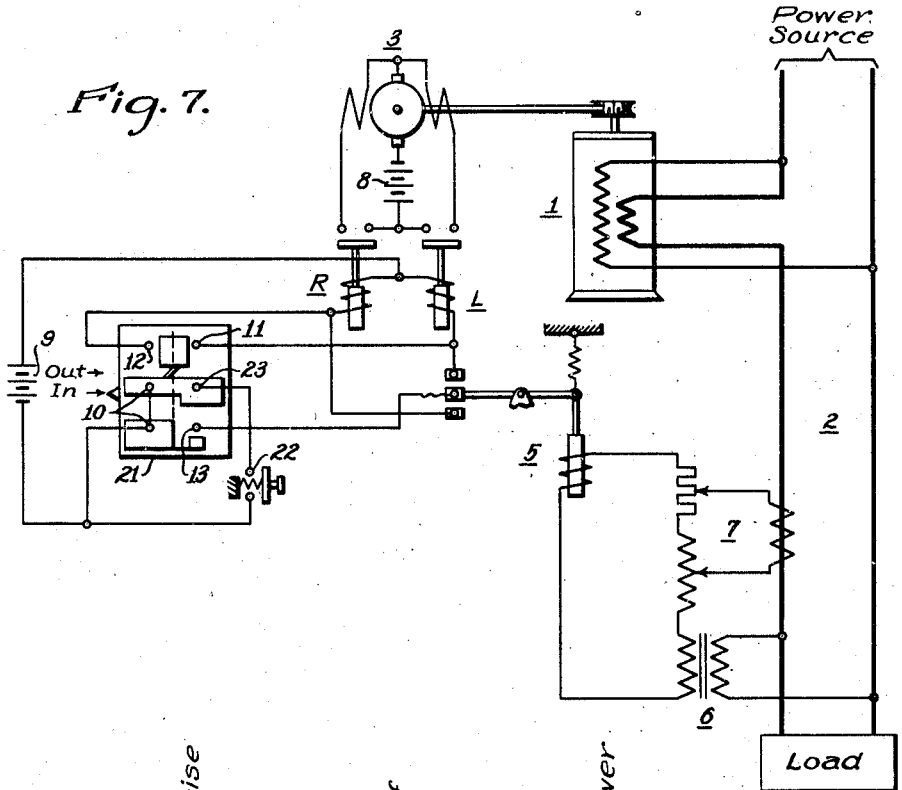
Fig. 7.
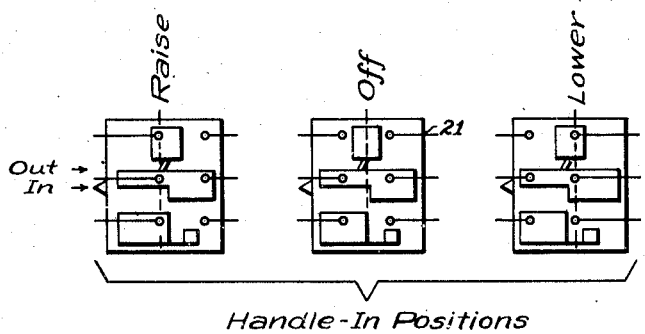
Fig. 8.
Handle-In Positions
Fig. 9.
Handle-Out Positions
WITNESSES:
Robert C. Baird
INVENTOR
John R. Dunbar.
BY G. M. Crawford
ATTORNEY Patented Oct. 11, 1949

2,484,210

UNITED STATES PATENT OFFICE 2,484,210

CONTROL AND TESTING SYSTEM

John R. Dunbar, Hamilton, Ontario, Canada, assignor to Westinghouse Electric Corporation, East Pittsburgh, Pa., a corporation of Pennsylvania Application May 2, 1947, Serial No. 745,620

8 Claims. (Cl. 171—97)

1

My invention relates, generally, to control systems, and more particularly, to systems for testing the operation of automatic devices, such as induction regulators and the like.

It is desirable to provide means for testing the operation of automatically controlled devices without transferring the control to manual operation and then back to automatic operation. Heretofore, this has been accomplished either by using a special test switch which, in conjunction with biasing means, permits the automatic operation to be checked or by utilizing a special transfer switch which includes a "test" position such that both the automatic and the manual controls are effective. In the latter case, special interlocking means are required to prevent faulty operation.

An object of my invention, generally stated, is to provide a system for testing automatically controlled devices which shall be simple and efficient in operation and which may be economically manufactured and installed.

A more specific object of my invention is to provide a testing system which does not require an extra switch to perform the testing operation.

Another object of my invention is to provide a testing system which does not require special interlocking means to prevent faulty operation during the testing procedure.

Other objects of my invention will be explained fully hereinafter or will be apparent to those skilled in the art.

In accordance with one embodiment of my invention, a control switch is so connected in the control circuits for an induction regulator or other device that the regulator or other device may be either manually or automatically controlled and the automatic means may be tested without passing through the "off" position of the control switch.

For a better understanding of the nature and objects of my invention, reference may be had to the following detailed description, taken in conjunction with the accompanying drawings, in which:

Figure 1 is a diagrammatic view of a control system embodying the principal features of my invention;

Figs. 2 and 3 are diagrammatic views showing various operating positions of a control switch utilized in the system shown in Fig. 1;

Fig. 4 is a diagrammatic view of a modification of the invention;

Figs. 5 and 6 are diagrammatic views showing

2 various operating positions of the control switch utilized in Fig. 4;

Fig. 7 is a diagrammatic view of another modification of the invention; and

Figs. 8 and 9 are diagrammatic views showing various operating positions of the control switch utilized in Fig. 7.

Referring to the drawings and particularly to Figure 1, a voltage regulator 1, of the induction type, is connected to regulate the voltage of an alternating-current power circuit 2. The regulator 1 is provided with a reversible driving motor 3 which may be selectively controlled manually by a control switch 4, or automatically by a voltage regulating relay 5. The relay 5 is energized by a potential transformer 6, which is connected to the power conductors 2. A compensator 7, of a well-known type, is connected in the energizing circuit of the relay 5.

Auxiliary relays or contactors L and R are interposed between the automatic and manual controlling means and the motor 3. The selective control of manual or automatic regulation is obtained by the control switch 4 which has six operating positions as illustrated in Figs. 2 and 3.

The switch 4 may be of the type described in United States Patent No. 1,744,245, issued January 21, 1930, to J. Sandin, and assigned to the Westinghouse Electric Corporation. As shown, the switch is of a drum type in which the drum may be moved axially as well as rotatably. The three positions of the switch with the "handle in" are illustrated in Fig. 2, and the three positions with the "handle out" are illustrated in Fig. 3. The energy for operating the motor 3 may be supplied by a battery 8, and the energy for operating the auxiliary contactors may be supplied by a battery 9.

If it is desired to control the regulator manually, the switch may be actuated to either the "lower" or the "raise" position with the handle in as illustrated in Fig. 2. If the switch is actuated to the "lower" position, a circuit is established from the battery 9 through contacts 10 and 11 of the switch 4 to the actuating coil of the relay L and back to the battery 9. This causes the relay L to close its contact members, thereby completing a circuit from the battery 8 to the motor 3 and back to the battery. This causes the motor 3 to operate in such a direction as to make the regulator 1 lower the voltage of the main circuit. As soon as the control switch 4 is returned to the "off" position, the relay L is deenergized and the motor 3 stops.

Similarly, when the control switch 4 is actuated to the "raise" position, the auxiliary relay R is energized through contact members 10 and 12 of the switch 4. The operation of the relay R completes a circuit from the battery through a different field winding and the armature winding of the motor 3, thereby causing the motor to operate in the reverse direction which causes the regulator 1 to raise the voltage of the circuit 2. This action will continue until the control switch 4 is returned to the "off" position.

During manual control of the regulator 1, the voltage regulating relay 5 will, of course, respond to the circuit voltage and will close one or the other of its sets of contact members depending upon which direction the voltage departs from the normal value for which the relay is set. However, this will have no effect upon the operation of the regulator because the control circuit through the regulating relay contact members is opened by the control switch 4.

If automatic operation is desired, the control switch handle is pulled out to the "automatic" position, thereby completing the connection from the battery 9 through contact members 10 and 13 of the switch 4 to the common contact beam of the regulating relay 5. If the voltage of circuit 2 now rises or falls, the regulating relay 5 will close one or the other of its sets of contact members, thereby energizing either the auxiliary relay L or the auxiliary relay R and causing the proper operation of the induction regulator 1 in the manner hereinbefore described in connection with manual operation. Such automatic operation will continue until the voltage is restored to normal, whereupon the relay 5 will have both of its sets of contact members open, and the motor will come to rest.

If it is desired to test the complete regulator control circuit for both manual and automatic regulation, the control switch 4 may be actuated to either the "test lower" position, or the "test raise" position as shown in Fig. 3. When the control switch is in the "test lower" position, the battery 9 is connected to the auxiliary relay L through contact members 10 and 11 of the switch 4, and the operation of motor 3 is the same as when the switch 4 is in the "manual lower" position.

If the voltage of the circuit departs sufficiently from normal during the testing operation, the regulating relay 5 will close one or the other of its sets of contact members, but, since the connection between contact members 10 and 13 of the control switch 4 is opened, the closing of the regulating relay contact members will not produce any conflicting control of the operating motor 3. However, as soon as the control switch 4 is returned to the "automatic" position, thereby closing the connection between the contact members 10 and 13, the regulating relay 5 immediately assumes control and causes the regulator to be operated to a position which will give normal voltage.

If the control switch 4 is actuated to the "test raise" position, the induction regulator is operated to raise the voltage of the circuit 2 in a manner similar to that described for the "manual raise" position of the control switch. When the control switch is returned to the "automatic" position, the voltage of the circuit will be returned to normal by the operation of the regulating relay 5.

Thus, the proper directions of operation of the regulator and its driving motor and the proper operation of the auxiliary relays may readily be checked or tested. Furthermore, by merely observing a voltmeter which indicates the voltage of circuit 2, the automatic operation of the regulator in correcting either an overvoltage condition or an undervoltage condition may readily be checked.

If the regulator 1 is in actual service, it is desirable to keep the voltage as near normal as possible while testing the regulator and checking the high and low voltage values at which the regulating relay closes its contact members. This may be done by momentarily actuating the control switch to the "test lower" or the "test raise" position until an operation of the automatic means is obtained.

However, it may be done more satisfactorily by utilizing a different embodiment of my invention which is illustrated in Figs. 4, 5, and 6. In this embodiment of the invention, the switch 4 is replaced by a switch 14. A resistor 15 having a tapped portion 16 is connected in the energizing circuit for the actuating coil of the regulating relay 5. An additional resistor 17 is connected between one of the conductors to the coil of the relay 5 and a contact member 18 of the switch 14.

The operation of the circuit including the control switch 14 is apparent from the previous description of the functioning of the control switch 4. During manual control of the regulator, the switch 14 functions in a manner similar to the switch 4 under manual control.

When the control switch 14 is actuated to the "test lower" position (Fig. 6), a circuit is established through contact members 19 and 20 of the control switch 14 which short-circuits the tapped portion 16 of the resistor 15, thereby increasing the voltage impressed on the coil of the relay 5 causing it to function as if the voltage of the circuit 2 had increased. The relay 5, accordingly, closes its contact members to energize the auxiliary relay L, thereby causing the motor 3 to operate in a direction to lower the voltage of circuit 2 to a predetermined value. When the control switch 14 is returned to the "automatic" position, the relay 5 will operate to return the voltage of circuit 2 to its normal value.

When the control switch 14 is actuated to the "test raise" position (Fig. 6), the circuit is completed through contacts 19 and 18 of the switch and the resistor 17 which shuts out some of the current normally flowing through the coil of the relay 5, thereby causing the relay to function as if the voltage of circuit 2 had been lowered. Accordingly, the relay 5 closes its contact members to energize the auxiliary relay R which, in turn, causes the motor 3 to operate the regulator 1 to raise the voltage of circuit 2. When the control switch 14 is returned to the "automatic" position, the automatic means will cause the motor 3 to operate in such a direction as to return the voltage of circuit 2 to its normal value.

Another alternative is illustrated in Fig. 7, in which the control switch 4 is replaced by a control switch 21. A push-button switch 22 is connected in the circuit between the battery 9 and a contact member 23 on the switch 21. The operation of the circuit when the switch 21 is in the "manual lower," "off," "manual raise" and "automatic" positions is the same as that previously described.

When the switch 21 is in the "test lower" and "test raise" positions (Fig. 9), the circuit between the battery 9 and the auxiliary relays L and R is not complete unless the spring return push button 22 is closed. This makes it impossible to obtain a "test lower" or a "test raise" operation by mistake when the operator had intended to return the regulator to manual control.

From the foregoing description, it is apparent that I have provided a system which makes it possible to control the operation of an electrical device by either manual or automatic control means. Furthermore, the testing of the automatic means may be done without passing through the "off" or "manual" control position and without the utilization of special interlocking or other auxiliary devices. While the present system is particularly suitable for controlling the operation of induction regulators, it is not necessarily limited thereto.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system, in combination, a device, electrically controlled means for operating said device in opposite directions, a self-contained control switch for manually controlling the operation of said electrically controlled means, and relay means for automatically controlling the operation of said electrically controlled means, said relay means being disconnected by said switch, said switch being operable to test the operation of said relay means without the intervention of auxiliary switch means.

2. In a control system, in combination, a device, electrically controlled means for operating said device in opposite directions, a self-contained control switch for manually controlling the operation of said electrically controlled means, and relay means for automatically controlling the operation of said electrically controlled means, said switch being operable to prevent said relay means from causing operation of said device and to test the operation of said relay means without the intervention of auxiliary switch means.

3. In a control system, in combination, a device, electrically controlled means for operating said device in opposite directions, a self-contained control switch for manually controlling the operation of said electrically controlled means, and relay means for automatically controlling the operation of said electrically controlled means, said switch being operable to cause operation of said device and to prevent said relay means from causing operation of said device and to test the operation of said relay means without the intervention of auxiliary switch means.

4. In a control system, in combination, a device, electrically controlled means for operating said device in opposite directions, a control switch for manually controlling the operation of said electrically controlled means, and relay means for automatically controlling the operation of said electrically controlled means, said switch having a handle rotatable to cause operation of said device and movable axially to prevent said relay means from causing operation of said device, said switch being operable to test the operation of said relay means without operating the said switch to a completely disconnected position.

5. In a control system, in combination, a device, electrically controlled means for operating said device in opposite directions, a control switch for manually controlling the operation of said electrically controlled means, and relay means for automatically controlling the operation of said electrically controlled means, said switch having a handle rotatable in opposite directions to cause operation of said device in opposite directions and movable axially to prevent said relay means from causing operation of said device, said switch being operable to test the operation of said relay means without operating the said switch to an off or completely disconnected position.

6. In a control system, in combination, a device, electrically controlled means for operating said device in opposite directions, a control switch for manually controlling the operation of said electrically controlled means, relay means for automatically controlling the operation of said electrically controlled means, said switch having a handle rotatable to cause operation of said device and movable axially to prevent said relay means from causing operation of said device, and a push-button switch cooperating with said switch in causing operation of said device when said handle is moved axially and then rotated to control the operation of said electrically controlled means.

7. In a control system, in combination, a device, electrically controlled means for operating said device in opposite directions, a control switch for manually controlling the operation of said electrically controlled means, relay means for automatically controlling the operation of said electrically controlled means, said switch having a drum rotatable to cause operation of said device independently of said relay means and movable axially and rotatable to cooperate with said relay means in causing operation of said device, and resistance means cooperating with said switch and said relay means in causing operation of said device when said drum is moved axially and then rotated to control the operation of said electrically controlled means.

8. In a control system, in combination, a device, electrically controlled means for operating said device in opposite directions, a control switch for manually controlling the operation of said electrically controlled means, relay means for automatically controlling the operation of said electrically controlled means, said switch having a drum rotatable to cause operation of said device independently of said relay means and movable axially and rotatable to cooperate with said relay means in causing operation of said device, and resistance means disposed in the energizing circuit for said relay means, said switch cooperating with said resistance means in causing operation of said device when said drum is moved axially and then rotated to control the operation of said electrically controlled means.

JOHN R. DUNBAR.

REFERENCES CITED

The following references are of record in the file of this patent:

UNITED STATES PATENTS

| Number | Name | Date |
| --- | --- | --- |
| 1,331,780 | Newhouse | Feb. 24, 1920 |
| 2,145,709 | Champlin | Jan. 31, 1939 |